United States Patent
Saini et al.

(10) Patent No.: US 12,140,021 B2
(45) Date of Patent: Nov. 12, 2024

(54) POLYMER-BASED WELL TRACERS WITH TUNABLE RELEASE PROFILE

(71) Applicant: ARAMCO SERVICES COMPANY, Houston, TX (US)

(72) Inventors: Rajesh Kumar Saini, Cypress, TX (US); Amy J. Cairns, Houston, TX (US); Shitong Sherry Zhu, Waban, MA (US); Ayrat Gizzatov, Winchester, MA (US); Wei Wang, Quincy, MA (US); Mohammed Sayed, Katy, TX (US); Hooisweng Ow, Woburn, MA (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/295,614

(22) Filed: Apr. 4, 2023

(65) Prior Publication Data

US 2024/0337183 A1 Oct. 10, 2024

(51) Int. Cl.
*E21B 47/11* (2012.01)
*C09K 8/80* (2006.01)

(52) U.S. Cl.
CPC .............. *E21B 47/11* (2020.05); *C09K 8/805* (2013.01)

(58) Field of Classification Search
CPC ................................ E21B 47/11; C09K 8/805
See application file for complete search history.

(56) References Cited

U.S. PATENT DOCUMENTS

| | | |
|---|---|---|
| 6,659,175 B2 | 12/2003 | Malone et al. |
| 6,875,208 B2 | 4/2005 | Santini, Jr. et al. |
| 7,560,690 B2 | 7/2009 | Stray et al. |
| 9,200,102 B2 | 12/2015 | Baran, Jr. et al. |
| 10,000,685 B2 | 6/2018 | Gordon et al. |
| 10,030,507 B2 | 7/2018 | Nyhavn et al. |
| 10,400,159 B2 | 9/2019 | Gupta |
| 10,865,637 B2 | 12/2020 | Kulyakhtin et al. |
| 11,084,966 B2 | 8/2021 | Burns et al. |
| 11,401,800 B2 | 8/2022 | Tippit et al. |
| 2011/0277996 A1 | 11/2011 | Cullick et al. |

(Continued)

FOREIGN PATENT DOCUMENTS

| | | |
|---|---|---|
| CN | 107882551 A | 4/2018 |
| CN | 109469481 B | 9/2019 |

(Continued)

OTHER PUBLICATIONS

A. Kumar and C. Sharma, "Advances in the analytical methods for the determination of fluorinated aromatic carboxylic acids in aqueous matrices: A review," Journal of Separation Science, Nov. 24, 2021, 17 pages.

(Continued)

*Primary Examiner* — Crystal J Lee
(74) *Attorney, Agent, or Firm* — Osha Bergman Watanabe & Burton LLP

(57) ABSTRACT

Described is a polymer-based well tracer. The polymer-based well tracer is a fluoropolymer having a fluorinated group. The fluoropolymer may be formed into a particle, a coating for proppant particulates, or encapsulated in a polymeric resin. Upon degradation or hydrolysis of the fluoropolymer, the fluorinated group having a fluorinated compound is released within the well.

7 Claims, 5 Drawing Sheets

(56) References Cited

U.S. PATENT DOCUMENTS

| | | | | |
|---|---|---|---|---|
| 2018/0334417 A1* | 11/2018 | Greuel | .................. | C07C 323/01 |
| 2021/0054263 A1* | 2/2021 | Saini | ..................... | E21B 43/267 |
| 2021/0079294 A1* | 3/2021 | Saini | ........................ | C09K 8/62 |
| 2021/0198563 A1* | 7/2021 | Jenkins | ................... | B01J 2/006 |

FOREIGN PATENT DOCUMENTS

| | | |
|---|---|---|
| CN | 111911139 A | 11/2020 |
| CN | 113980675 A | 1/2022 |
| CN | 114458303 A | 5/2022 |
| EP | 1277051 B1 | 8/2006 |
| IN | 201711029800 A | 7/2019 |

OTHER PUBLICATIONS

Liu et al., "A novel photoacoustic spectroscopy gas sensor using a low cost polyvinylidene fluoride film," Sensors and Actuators B: Chemical, Sep. 14, 2018, 16 pages.

Myers, "Water And Gas Tracer Studies In Carbonate Oil Reservoirs," U.S. Department Of Energy Office Of Scientific And Technical Information, 1995, 3 Pages.

Quamber et al., "The application of chemical tracer monitoring in multi stage acid frac wells in the mature Bahrah field, North Kuwait", (2019), SPE-198037-MS, presented at SPE Kuwait Oil & Gas Conference and Show held in Mishref, Kuwait, 19 pages.

Schaff, "Fluorinated esters: synthesis and identifications," (1988). Dissertations and thesis. Paper 3921. Portland State University, 116 pages.

Tayyib et al., "Overview of tracer applications in oil and gas industry," (2019), SPE-198157-MS presented at SPE Kuwait Oil & Gas Conference and Show held in Mishref Kuwait, 21 pages.

\* cited by examiner

POLYMER-BASED WELL TRACERS WITH TUNABLE RELEASE PROFILE

BACKGROUND

Tracer technology is a monitoring and surveillance tool used in the oil and gas industry for a wide range of applications, such as improving reservoir characterization, waterflood optimization, determining remaining oil saturation, and discerning fluid pathways and connectivity between wells.

Monitoring and confirming production from different zones in oil and gas wells, especially post-treatment after acid and fracturing stimulation operations, remains a challenge. Production logging tools (PLTs) are sometimes used for this purpose. However, PLTs require the use of a wireline and specialized equipment, causing production to be halted. Moreover, a wireline company must be hired to evaluate the production. Deploying PLTs is costly in terms of downtime and loss of productivity. Therefore, a cost-effective chemical tracer that can be injected for evaluating the oil and gas production without interruptions to hydrocarbon flow is needed.

The state-of-the-art chemical-based tracers include radioactive tracers, such as tritiated hydrocarbons (e.g., tritiated ethane, tritiated methane, tritiated butane, tritiated water, carbon isotope, F12, F13B), tritiated hydrogen, and Kr85. Notably, the main tracers used in gas wells consist of perfluorocarbons, sulfur hexafluoride, deuterated hydrocarbons and freons (e.g., freon-11, freon-113). Freon-type tracers have been phased out due to their negative environmental considerations, while deuterated hydrocarbons remain too expensive for large-scale use.

While perfluorocarbon chemicals and sulfur hexafluoride are stable under reservoir conditions, there remains a need for the development and use of more cost-effective gas tracers. Fluorocarbon and deuterated molecules are not commonly present in the environment and, therefore, provide a unique fingerprint for detection. However, such gas tracers are expensive and pose environmental concerns. Additionally, collection and characterization of such tracers is a challenge because trace amounts of the gas molecules are invisible. As a result, constant gas sampling is required to collect enough tracer for unambiguous detection. Importantly, the reported technologies do not include a controlled release functionality or an ability to reside in a formation for extended durations under the harsh reservoir temperatures of gas wells.

Accordingly, the development of tracers capable of withstanding detection for prolonged durations poses significant challenges. Advanced chemical-based tracers that can be detected up to several weeks, or even months, would provide a great benefit to the oil and gas industry. Furthermore, there is a need for tracers that are suitable for oil wells having an increasing number of stages for fracturing. Therefore, there is a need for alternative oil well tracers that can be readily detected such that production from different zones can be determined.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a polymer-based well tracer. The polymer-based well tracer is a fluoropolymer having a fluorinated group. Upon degradation or hydrolysis of the fluoropolymer, the fluorinated group comprising a fluorinated compound is released.

In another aspect, the fluoropolymer is one of a polyester, a polyamide, a polycarbonate, a polyurethane, an oligomer, or any polymer thereof.

In another aspect, the fluorinated compound is a fluoro alcohol, a fluoro diol, or a fluoro polyol.

In another aspect, the fluoropolymer is synthesized from one or more of aliphatic, cycloaliphatic, aromatic and heterocyclic fluoro alcohols, fluoro carboxylic acids, fluorophenols, fluorophenyl carboxylic acids, fluoro triazoles, and fluoroimidazoles.

In another aspect, the fluoro alcohol is one of trifluoromethanol, trifluoroethanol, 2,2-difluoroethanol, 2-fluoroethanol, 2,2,3,3,3-pentafluoro-1-propanol, 2,2,3,3-tetrafluoro-1-propanol, hexafluoro-2-propanol, nanofluoro-tert-butyl alcohol, 1,1,1,3,3,3-hexafluoro-2-methyl-2-propanol, 1,1,1-trifluoro-2-propanol, 2,2,3,3-tetrafluoro-1,4-butanediol, and 2,2,3,3,4,4,5,5-octafluoro-1,6-hexanediol.

In another aspect, the fluoro alcohol is reacted in a ring opening polymerization to form one of a polymeric polylactide, a polyglycolide, a polylacetone, or a polylacetamide.

In another aspect, the fluoro alcohol is reacted in a ring opening polymerization to form one of a polymeric polylactide, a polyglycolide, a polylacetone, or a polylacetamide as an end group of the fluoropolymer.

In another aspect, the fluoropolymer is formed into a particle.

In another aspect, the fluoropolymer is coated onto proppant particulates.

In another aspect, the fluoropolymer is encapsulated in a polymeric resin.

In one aspect, embodiments disclosed herein relate to a method for preparing and using a polymer-based well tracer. A fluoropolymer having a fluorinated group is synthesized from a polymer and a fluorinated compound. The fluoropolymer and a fluid is introduced into a formation of a well. Upon degradation or hydrolysis of the fluoropolymer, the fluorinated compound is released. The fluorinated compound is detected at a surface of the well, and a property of the well is evaluated based on detection of the fluorinated compound.

In another aspect, the fluid is a fracturing fluid, an acidizing fluid, or a pad fluid.

In another aspect, a mixture of at least one fluorinated compound and a plurality of polymers having different degradation rates is formed. The mixture is introduced into the formation of the well.

In another aspect, the formation comprises a plurality of stages, and a different fluoropolymer is introduced into each stage.

Other aspects and advantages of the claimed subject matter will be apparent from the following description and the appended claims.

DETAILED DESCRIPTION

Figure 1:
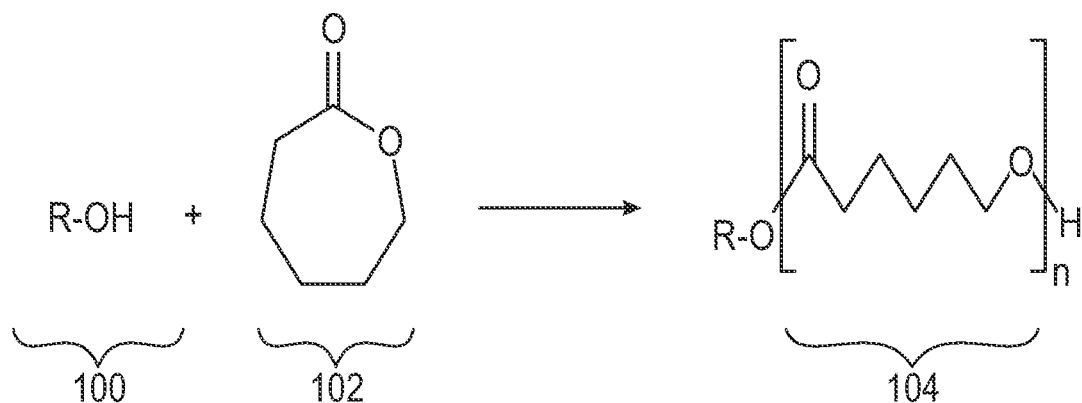
FIG. 1 illustrates ring opening polymerization of a fluoro alcohol with caprolactone to form a polymeric polycaprolactone material according to embodiments of the present disclosure.

In one aspect, embodiments disclosed herein relate to oil, gas, and water tracers comprising a fluorinated-based degradable polymeric material, or fluoropolymer. The fluoropolymer is introduced (injected or pumped) along with a fluid into a formation of a well.

Tracer technology has been used for diagnosing hydraulic fractures, assessing clean-up efficiency, and evaluating the contribution of each fracturing stage to the total hydrocarbon production. The tracer molecules according to some embodiments of the present disclosure may be used to evaluate the production of gas, oil, or both.

Preparation of Fluorinated-Based Degradable Polymeric Material

The fluoropolymer is then prepared into an injectable form. For example, the fluoropolymer may be in the form of particles, a coating for proppant particulates, or encapsulated within a polymeric resin. In one or more embodiments, particles of fluoropolymer are injected with fracturing fluid and proppant particulates in a hydraulic fracturing operation. The fluoropolymer particles deposited in a fracture degrade slowly and release a fluorinated tracer.

In some scenarios, the fluoropolymer particles may have a different density from the proppant particulates such that the fluoropolymer particles may float on the fluid or be deposited in a segregated manner. If the proppant particulates have a density similar to water, there is a propensity for the fluoropolymer particles to flow back quickly with the fluid. In this situation, coating of the proppant particulates with the fluoropolymer is preferred so that coated proppant and fluoropolymer particles have a similar density and may be deposited homogeneously throughout the fracture.

Encapsulation of the fluoropolymer in polymeric resin is useful when different rates of degradation are desired. There are a variety of resins, such as epoxy, furan, urethane, phenolic, and polyester, with different rates of degradation at different temperatures and wellbore conditions. The properties of the resins may be utilized to tailor the release profile of the fluorinated tracers.

All of the preparations described above aid in maintaining the fluorinated tracer in a formation for longer periods of time, such as weeks to months. Particle and encapsulated tracers may be used in matrix acidizing as well as acid fracturing. In matrix acidizing, a wormhole may be sized such that smaller particles are needed to be deposited into the wormhole. The smaller particles may be of a micron size range or smaller.

In one or more embodiments, the fluoropolymer may be formed to be sufficiently small (i.e., low molecular weight) such that it is soluble in fracturing fluid or treatment fluid. The fluid and dissolved fluoropolymer may then be pumped into the formation to penetrate the formation and be deposited/adsorbed on the formation. As the fluoropolymer slowly degrades, fluoro chemicals are released, which may be used for production and/or oil saturation evaluation.

According to one or more embodiments, the fluoropolymer comprises a fluorinated group, such as an end group, comprising a fluorinated compound. In one or more embodiments, the fluoropolymer is hydrolysable and decomposes, or degrades, by reacting with water. When the fluoropolymer degrades, the fluorinated compound, such as a fluorinated chemical, is released as a tracer molecule. The fluorinated compounds may be detected at the surface of the well to compare properties of various wells and zones of a well. Properties that may be evaluated and compared include, but are not limited to, rate of gas or oil production, oil well saturation, presence of water, oil in place, and gas in place.

The fluoropolymers may be pumped with a fracturing fluid or a treatment fluid, such as an acidizing fluid, into a formation of a well. In one or more embodiments, the fluoropolymers may be mixed in fluid prior to pumping. In another embodiment, if the fluoropolymer is in solid form, the fluoropolymer may be suspended within the fracturing fluid and then pumped. Both the non-solid and treatment-fluid soluble polymers are low molecular weight oligomers or polymers of these fluoropolymers. The soluble polymers may be soluble in hydrocarbon/oil or aqueous phase.

The fluoropolymers according to embodiments of the present disclosure degrade or hydrolyze in fluid (e.g., fracturing fluid, acidizing fluid) and release a fluorinated compound over a longer duration than existing tracer molecules. The released fluorinated compounds do not naturally exist in the well and, therefore, can be easily distinguished from other well fluids and/or gases by known analytical techniques. The detection of tracer molecules may be performed at a scale of parts per million (ppm) to parts per billion (ppb) using analytical methods, since the concentration of tracer molecules in the fluid may be very low (parts per thousand to parts per billion range).

In one or more embodiments, the fluorinated compounds are non-reactive and will not absorb on formations after being pumped. Therefore, the fluorinated compounds may be slowly recovered during production. The fluorinated compounds are released from fluoropolymers and are detectable over long periods of time (e.g., weeks, months) such that the performance of a well and different producing zones may be analyzed over time.

Suitable fluorinated compounds include, but are not limited to, gaseous fluorinated chemicals, low-boiling-point fluorinated chemicals, water soluble fluorinated chemicals, and/or oil soluble fluorinated chemicals. Fluoro alcohols, fluoroaromatic alcohols, fluorophenols, fluorodiols, fluoropolyols, fluorocarboxylic acids, fluoroaromatic carboxylic acid, fluorophenyl carboxylic acid, fluoro amines, fluorothiol, fluoronitrate, fluorotriazoles, fluoroamidazoles, fluorosulfonic acid, or fluorophosphoric acid may be used to form the degradable fluoropolymer described herein.

In one or more embodiments, the fluoropolymer synthesized is a polyester, a polyamide, a polycarbonate, an oligomer, or any polymer thereof. In one or more embodiments, the fluoropolymer is prepared, or synthesized, with one or more of the following fluorinated compounds: aliphatic, cycloaliphatic, aromatic and/or heterocyclic fluoro alcohols, fluoro carboxylic acids, fluorophenols, fluorophenyl carboxylic acids, fluoro triazoles, and fluoroimidazoles. The fluorinated compounds used to synthesize the fluoropolymers are chemically stable and may be in solid or liquid form.

In some embodiments, the fluoropolymer releases an oil or water partitioning fluorinated alcohol as a tracer molecule. In some embodiments, the fluoro alcohols include 2,2-difluoroethanol (boiling point of 95° C.), 2-fluoroethanol, 2,2,3,3,3-pentafluoro-1-propanol (boiling point of 80° C.), 2,2,3,3-tetrafluoro-1-propanol (boiling point of 107° C.), 1,1,1-trifluoro-2-propanol (boiling point of 81-82° C.), pentafluorophenol, trifluoromethanol (boiling point of 22° C.), trifluoroethanol (boiling point of 74° C.), 2,2,3,3-tetrafluoro-1-propanol (boiling point of 107° C.), hexafluoro-2-propanol (boiling point of 59° C.), nanofluoro-tert-butyl alcohol (boiling point of 45° C.), and 1,1,1,3,3,3-hexafluoro-2-methyl-2-propanol (boiling point of 60-62° C.). Other fluoro alcohols may also be used.

In one or more embodiments, low boiling point fluoro alcohols are used to synthesize the fluoropolymer. In this example, the fluoropolymer will undergo hydrolysis or degradation, generating gaseous or low-boiling-point fluorinated alcohols as tracers. In one embodiment, fluoro alcohols having a low boiling point are reacted in a ring opening polymerization with lactide, glycolide, cyclic lactone, or cyclic lactam to make polymeric polylactide, polyglycolide, polylacetone, or polylacetamide, respectively, which may form end groups of the fluoropolymer.

In accordance with some embodiments of the present disclosure, high boiling point fluoro alcohols may be used in the preparation of the fluoropolymer as a precursor for oil tracer molecules. For the purposes of this disclosure, low boiling point fluoro alcohols are those with a boiling point below of 100° C. and below. The boiling point of high boiling point fluoro alcohols is above 100° C. Gas wells are generally at temperature of 300° F. (approximately 150° C.) and above.

Additionally, longer chain fluoroalcohols (C4-12) may be used for preparation of the fluoropolymer. Different derivatized fluorophenol and fluoro aromatic alcohols may also be used. Furthermore, fluoro heterocyclic compounds, such as 5-Fluoro-1H-benzo[d][1,2,3]triazole-6-carboxylic acid, 4-fluoro-phenylcarbamoyl)-3H-imidazole-4-carboxylic acid, and 5-fluoro-1H-benzo[d]imidazole-2-carboxylic acid, may be used in synthesis of the fluoropolymer.

In some embodiments, fluoro diols and fluoro polyols may be used as tracers for oil and water, including, but not limited to, 2,2,3,3-tetrafluoro-1,4-butanediol (boiling point of 70° C.) and 2,2,3,3,4,4,5,5-octafluoro-1,6-hexanediol. The fluoro diols may be converted into fluoropolymers through reactions with dicarboxylic acids, such as adipic acid, to form polyesters. Difluoro diols or polyols may also be reacted with diisocynate to make a polyurethane as the fluoropolymer. Polyurethanes may be used as degradable materials which will release fluoro diols of various structures as tracer molecules.

In some embodiments, the fluoropolymer is formed into particles (from about 100 microns to about 3,000 microns) and pumped into a gas well with proppant particulates (e.g., sand, resin-coated sand, ceramic materials) and fracturing fluid during fracturing. In other embodiments, the fluoropolymer is coated onto proppant particulates, mixed with non-coated proppant particulates, then pumped into the gas well with fracturing fluid during fracturing. In another embodiment, the fluoropolymer is formed into smaller particles (approximately 50 microns to approximately 2,000 microns), pumped with acidizing stimulation fluids, and deposited into a wormhole/fracture of a formation. Alternatively, the fluoropolymer is formed into beads for use in fracturing or acidizing applications of gas wells.

The moisture present in a gas well/formation, in conjunction with a high temperature, leads to degradation or hydrolysis of the fluoropolymer. The fluorinated end group is then released, revealing a gaseous tracer molecule. Similarly, a fluorinated compound, such as a fluoro alcohol, may be reacted with other materials to produce solid fluoropolymers that degrade at various temperatures and time intervals.

In one or more embodiments, the fluoro compounds are blended, mixed, or reacted with polymers, such as melamine formaldehyde resin, urea formaldehyde resin, polyurethane resin, phenolic formaldehyde resin, epoxy resin, polyester resin, polycarbonate resin, and the like. For both blending and mixing, the fluoro compound and polymer are homogenized using melt mixing, solvent mixing, or any other suitable method. Additionally, the fluoro compound may be entrapped, or encapsulated, in resin matrix physically without any chemical bond formation between the fluoro compound and polymer. In a reaction with a polymer, the fluoro compound (e.g., fluoro alcohol) forms a covalent bond with the polymer or resin and becomes part of the polymer. An ester bond, amide bond, ether bond, urethane bond, or the like may be formed. The mixtures may be made into solid parts, such as particles, to be pumped into a formation for slow release of the tracer molecules. Since many of the described resins in their crosslinked form are slowly degradable materials, they will provide long term release of the tracers, spanning from weeks to years.

In some embodiments, the tracer molecule, or fluorinated compound, is mixed with different polymers having different degradation rates and pumped into a well at the same interval and in equal weight. For example, Tracer A may be mixed with five different polymers, forming five different fluoropolymers having different degradation rates. The different fluoropolymers may be introduced (i.e., pumped) as a mixture of equal weight in a particular zone of a well. In this example, the fluoropolymer that degrades the fastest will release the fluorinated compound first. The fluoropolymer that degrades the slowest will release the fluorinated last, and the other fluoropolymers will degrade at timepoints between the fastest and the slowest fluoropolymers. Thus, detection of flow from reservoirs may be measured from days to months depending on the degradation profile of the polymer (or polymers) in which the fluorinated compound is mixed.

In one or more embodiments, a low boiling fluoro alcohol may be reacted in ring opening polymerization with lactide, glycolide, cyclic lactone or cyclic lactam to make polymeric polylactide, polyglycolide, polylactone, or polylactamide with a fluorinated compound at a first end and a hydroxy (OH) group at a second end. A mixture of the aforementioned monomers may be used to produce a copolymer for fine tuning the degradation rate of the final polymer. In some embodiments, the ring opening polymerization reaction may occur in the presence of a catalyst and a fluoro alcohol. Non-limiting examples of catalysts include tin octoate (Sn(Oct)$_2$) and aluminum isopropoxide (Al(Oi-Pr)$_3$). In the reaction, the fluoro alcohol behaves as an initiator, and the catalyst (e.g., $Sn(Oct)_2$) acts as a Lewis acid catalyst.

FIG. 1 illustrates an example of ring opening polymerization of a fluoro alcohol 100 with caprolactone 102 to form a polymeric polycaprolactone material 104 having a fluoro group (R) at one end, forming an ester bond. Upon hydrolysis of the ester, the fluoro alcohol is released as a tracer molecule. The fluoro group (R) may be $CF_3$, $C(CF_3)_3$, $CH_2CF_3$, $CH(CF_3)_2$, $C(CH_3)(CF_3)_3$, or $CH(CH_3)(CF_3)$.

Figure 2:
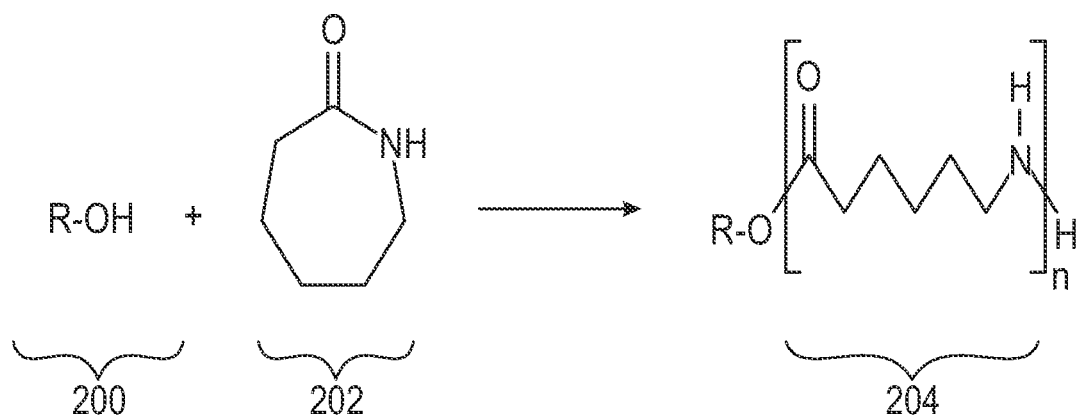
FIG. 2 illustrates ring opening polymerization of a fluoro alcohol with caprolactam to form a polymeric polycaprolactam material according to embodiments of the present disclosure.

FIG. 2 shows ring opening polymerization of fluoro alcohol 200 with caprolactam 202 to provide polymeric polycaprolactam material 204 having a fluoro group (R) at one end forming an ester bond. Upon hydrolysis of the ester, the fluoro alcohol is released as a tracer. Polycaprolactam has a relatively higher degradation temperature than polycaprolactone and, therefore, may be used in higher temperature wells, or to provide a slower degradation and longer release profile for the tracer. The fluoro group (R) may be $CF_3$, $C(CF_3)_3$, $CH_2CF_3$, $CH(CF_3)_2$, $C(CH_3)(CF_3)_3$, or $CH(CH_3)(CF_3)$.

Figure 3A:
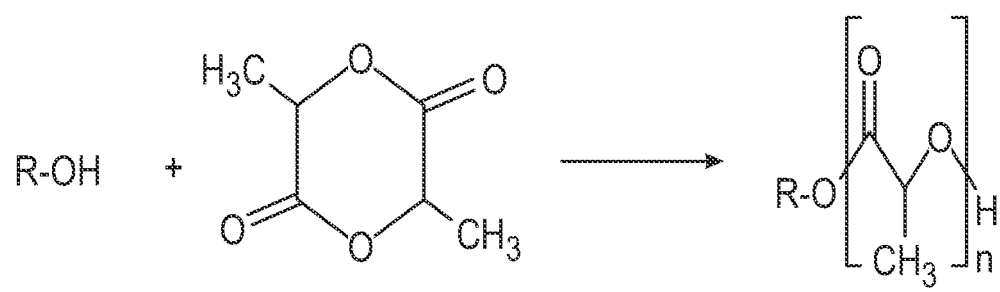
FIG. 3A illustrates ring opening polymerization of a fluoro alcohol with lactide to form a polymeric polylactide (PLA) material according to embodiments of the present disclosure.
Figure 3B:
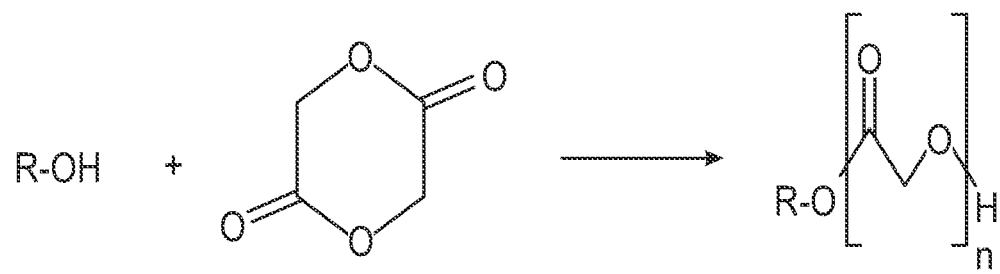
FIG. 3B illustrates ring opening polymerization of a fluoro alcohol with glycolide to form a polyglycolide material according to embodiments of the present disclosure.

FIG. 3A illustrates ring opening polymerization of a fluoro alcohol with lactide to form a polymeric polylactide material with a fluoro group at an end forming an ester bond. FIG. 3B illustrates ring opening polymerization of a fluoro alcohol with glycolide to provide a polyglycolide material with a fluoro group at an end forming an ester bond. The ester on hydrolysis will provide the fluoro alcohol as the tracer. For both FIG. 3A and FIG. 3B, the fluoro group (R) may be $CF_3$, $C(CF_3)_3$, $CH_2CF_3$, $CH(CF_3)_2$, $C(CH_3)(CF_3)_3$, or $CH(CH_3)(CF_3)$.

Figure 4:
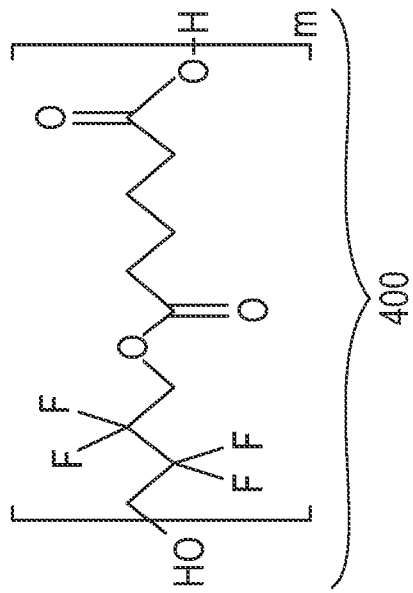
FIG. 4 illustrates the synthesis of a polyester formed by the reaction of 2,2,3,3-tetrafluoro-1,4-butanediol with adipic acid according to embodiments of the present disclosure.
Figure 4:
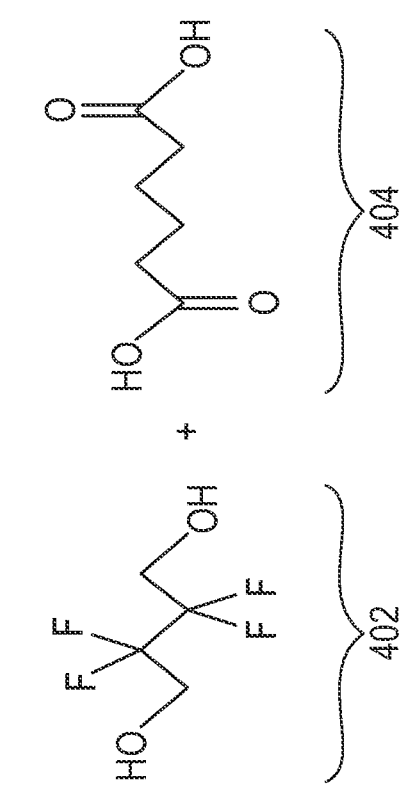

In another embodiment, fluoro diols and polyols, such as 2,2,3,3-tetrafluoro-1,4-butanediol (70° C.), 2,2,3,3,4,4,5,5-octafluoro-1,6-hexanediol, are used as tracer molecules for oil and water. The diols may be converted into polymeric derivatives via a reaction with dicarboxylic acid to form a polyester. One dicarboxylic acid that may be utilized is adipic acid. Difluoro diol or polyols may also be reacted with diisocynates to make polyurethanes. The produced polyurethane may be used as a degradable material which will release the fluoro diol of various structures as tracer molecules. FIG. 4 illustrates the synthesis of a polyester 400 formed by the reaction of 2,2,3,3-tetrafluoro-1,4-butanediol 402 with adipic acid 404. The polyester 400 may be made into particles or coated on proppants and pumped downhole. On hydrolysis, the polyester 400 will degrade to form fluorodiol that may be used as the tracer.

Figure 5:
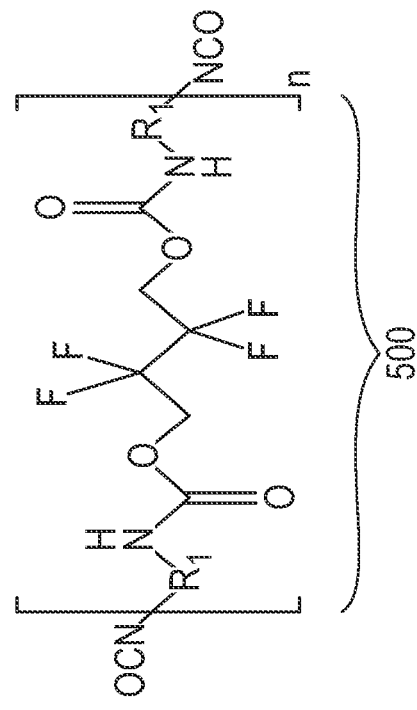
FIG. 5 illustrates the synthesis of a polyurethane formed by the reaction of 2,2,3,3-tetrafluoro-1,4-butanediol with hexamethylene diisocyanate according to embodiments of the present disclosure.
Figure 5:
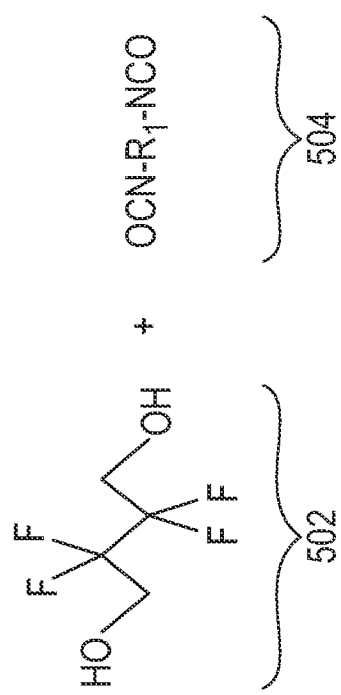

FIG. 5 illustrates the synthesis of a polyurethane 500, or urethane polymer, formed by the reaction of 2,2,3,3-tetrafluoro-1,4-butanediol 502 with hexamethylene diisocyanate 504. The polyurethane 500 may be made into particles or coated on proppants and pumped downhole. On hydrolysis, the polyurethane 500 will degrade to form fluorodiol that may be used as the tracer. Non-limiting examples of fluoro chemicals that may be used include $CF_3CO_2H$, $CF_3CF_2CO_2H$, $CF_3(CF_2)_3CO_2H$, $CH_3(CF_2)_4CO_2H$, and $C_6F_{11}CO_2H$.

Application of Fluorinated-Based Degradable Polymeric Material

For use of the fluorinated-based degradable polymer material, or fluoropolymer, described herein, an amount of fluoropolymer, such as between about 1 gallon per thousand gallons (gpt) and about 5 gpt is pumped with a treatment fluid, such as fracturing fluid, into a stage of the formation. The amount of fluoropolymer may be from 0.5 to 5 gpt of the treatment fluid. The amount of fluid pumped may be from about 200,000 gallons (gal) to about 1,000,000 gal per stage of the formation. When using a solid material/support, the amount of tracer may be between about 1 wt % to about 3 wt % of the amount of proppant. The amount of proppant particulates may be between about 1 pound per gallon (lb/gal) to 10 lb/gal of the fracturing fluid. When a solid fluoro alcohol polymer is coated on the proppant particulates, the amount of coating may be between about 1 wt % to 5 wt % of the amount of the proppant particulates. When the fluoro alcohol polymer is encapsulated in a polymeric resin, such as phenolic resin, epoxy resin, melamine formaldehyde resin, polyester resin, acrylic resin, or polyurethane resin, the amount of fluoro alcohol polymer may be between 1 wt % to 10 wt % of the resin. When fluoropolymer is by itself, the degradation depends on the rate of degradation of the polymer. When the fluoropolymer is encapsulated in resin, the degradation of the resin will occur first followed by degradation of the encapsulated material.

According to one or more embodiments of the present disclosure, the tracer may also be mixed with an acidizing fluid, such as 1-28% hydrochloric acid (HCl), then used for matrix acidizing or acid fracturing of carbonates. Here, the tracers may be added to the acidizing fluid in an amount of about 1 gpt to about 5 gpt. The tracer may be pumped in the pad fluid (a fluid used to initiate hydraulic fracturing that does not contain proppant) or throughout the treatment. Based on predetermined criteria, such as well conditions (e.g., temperature), an appropriate tracer (fluorinated compound) is selected. For instance, for some gas wells, fluoro alcohols with low boiling points may be suitable. For each stage, different fluoro tracers may be injected. The sequence of injection of different tracers in each stage should be identical for comparison purposes.

In some embodiments, all stages (i.e., reservoir intervals) of the formation are fractured with different fluoro polymer tracers. The different fluoro polymer tracers may be differentiated by their different elution times with one or more analysis techniques know to those skilled in the art. Non-limiting examples of analysis techniques that may be utilized include high-performance liquid chromatography (HPLC), gas chromatography (GC), nuclear magnetic resonance (NMR), ultraviolet-visible spectroscopy (UV-Vis), mass spectrometry, and Fourier-transform infrared spectroscopy (FTIR).

After all the stages are fractured, the fluids are flown back to the well. Samples are collected periodically, such as hourly, daily, and/or weekly. In one or more embodiments, one liter (L) of well fluid samples is collected at each timepoint. In gas wells, produced gas may be collected in a cylinder and analyzed. The produced gas may also be analyzed by GC, GC-MS, or other techniques known in the art. The tracers are extracted from the well fluid by known techniques. The extracted tracers are than analyzed by HPLC, GC, NMR, UV, mass spectrometer, and FTIR. The concentrations of different types of tracers in the mixture are determined. Since the tracers are non-reactive, the concentrations of the tracers provide a ratio of production from different stages. The analysis is based on mass balance.

Integrating tracer concentration with water and oil production rates yields the total mass of tracer recovered from each stage. The ratio of recovered tracer mass to the total injected tracer mass reveals the stage load fluid cleanup efficiency and oil tracer recovery. Comparing the concentration of each tracer yields the stage inflow contribution of fracturing fluid and hydrocarbon production. The degradation profiles of tracers (i.e., rate of degradation) may be used to quantify the production in one stage compared to other stages. For example, if the ratio of a first type of tracer to a second type of tracer is 2:1 and the first type of tracer in one stage degrades two times faster than the second type of tracer in a different stage, then both stages are equally producing.

Sample Collection and Analysis

Fluid samples may be collected after regular intervals and then analyzed. A tracer may be extracted from a collected water or oil sample (including produced water and oil), then measured by HPLC, GC/MS, or any other suitable analytical technique. In gas tracer applications, the gas may be sampled at set intervals and analyzed by GC to determine the concentration of each gas tracer. One of the technologies that may be used for liquid-liquid/gas-liquid separations includes the membrane-based separation technique developed by Zaiput Flow Technologies located at 101a First Ave, Suite 100 Waltham, MA 02451.

Example: Hydrolysis of Polylactide (PLA) in Fresh Water

Figure 6:
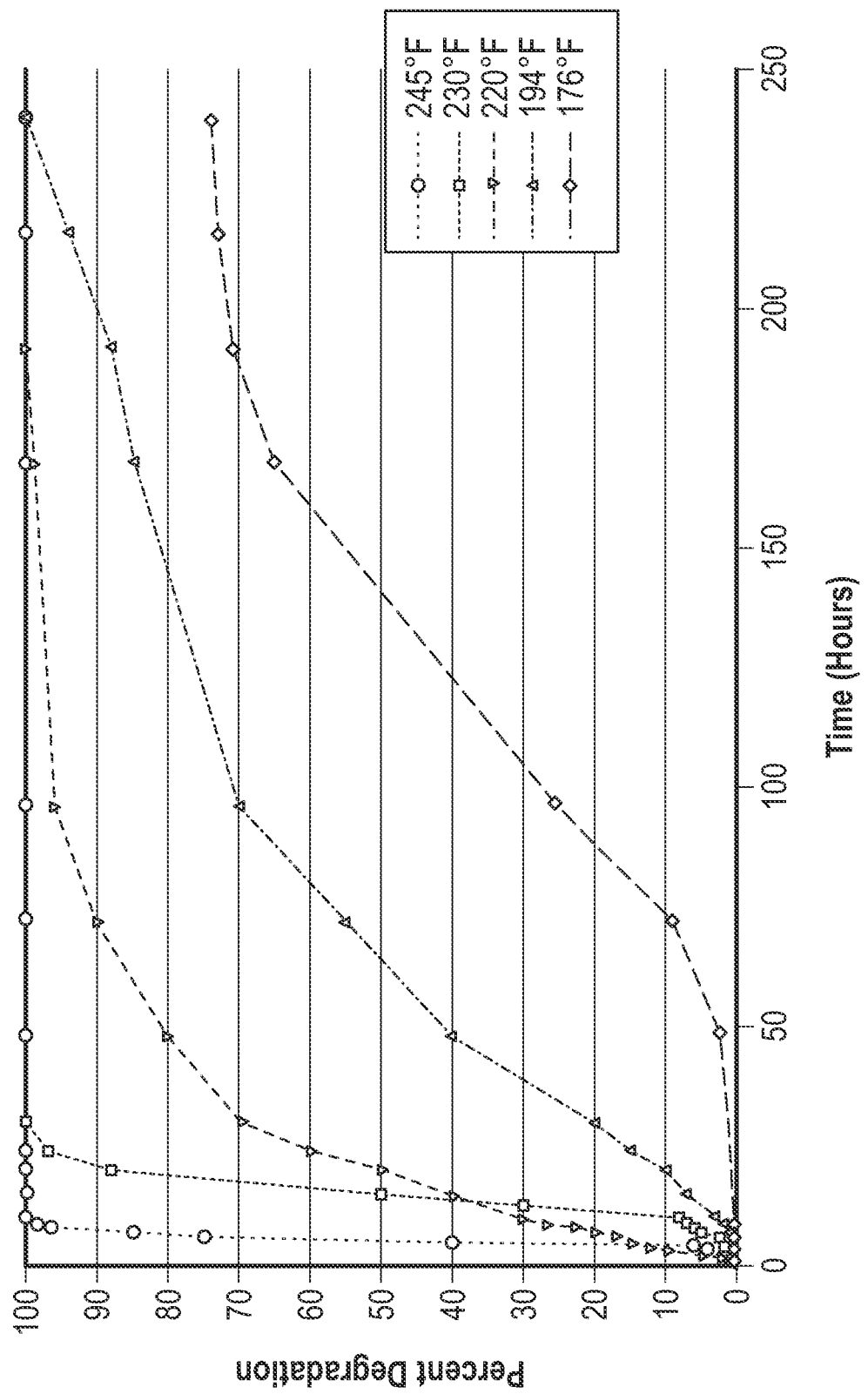
FIG. 6 illustrates a degradation profile of PLA at different temperatures over time according to embodiments of the present disclosure.

A degradation test of PLA was conducted by adding 5 grams (g) of PLA to a bottle containing 100 milliliters (ml) of fresh water. The bottle was placed in a pressurized autoclave (1000 pounds per square inch (psi)) and heated at a predetermined temperature for various time intervals. The samples were then filtered, dried, and weighed to determine the relative degradation as a function of time. FIG. 6 shows the degradation profile (% degradation) of PLA at different temperatures over time. As illustrated, higher temperatures lead to a higher percentage of degradation at an earlier timepoint in the experiments. Under these conditions, PLA degrades to form lactic acid as a product. The alcohol is then produced and can be analyzed to determine an amount of production and oil saturation.

Figure 7:
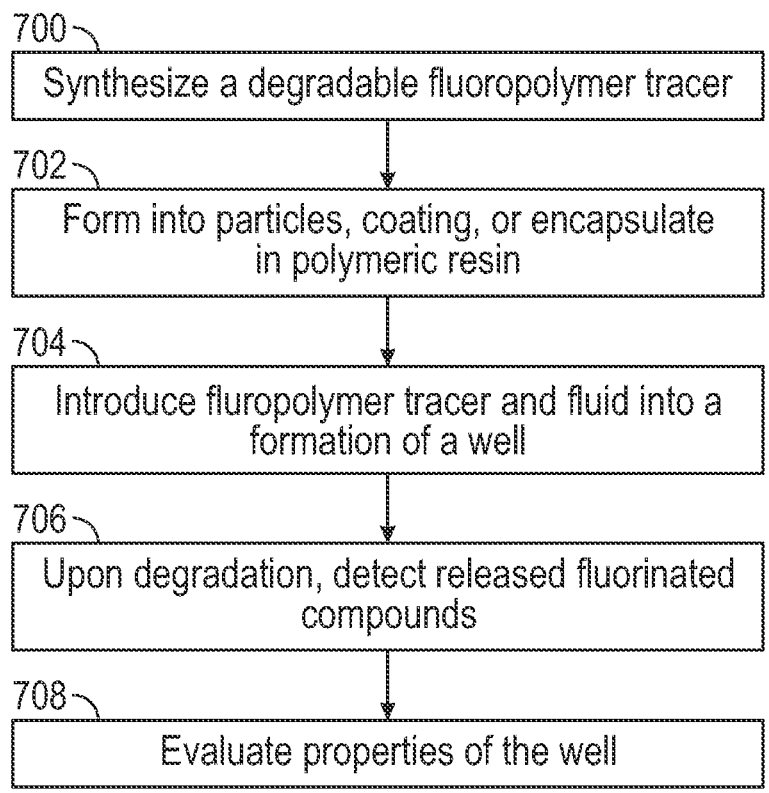
FIG. 7 illustrates a method for preparing and using a polymer-based well tracer according to embodiments of the present disclosure.

FIG. 7 is a flow diagram illustrating the method for preparing and using a polymer-based well tracer according to embodiments of the present disclosure. Each of the following steps is described in detail above. In step 700, a degradable fluoropolymer tracer is synthesized. In step 702, the synthesized fluoropolymer tracer is formed into a particle, a coating, or encapsulated in a polymeric resin. The fluoropolymer tracer along with a fluid is introduced into a formation of a well in step 704. Following degradation of the fluoropolymer, released fluorinated compounds are detected at the surface of a well in step 706. Finally, in step 708, one or more properties of the well are evaluated.

Embodiments of the present disclosure may provide at least one of the following advantages. The oil, gas, and water tracers described herein are useful in many applications, including, but not limited to, monitoring the production of oil and gas from various zones/stages following acidizing and/or hydraulic fracturing. For instance, acid resistance tracers formed according to embodiments of the present disclosure may aid in determining acid stimulation effectiveness. The effectiveness of hydraulic fracturing effectiveness may also be assessed. Furthermore, following enhanced oil recovery, remaining oil saturation may be measured using the tracers, including after secondary recovery. In addition, the most efficient waterflooding strategy may be determined by monitoring the effect of water and gas injection using the tracers described herein. A mud tracer may be utilized to assess mud infiltration, monitor mud circulation, detect casing leaks, and evaluate wellbore chemicals.

The invention described herein may also be used to determine the amount of crossflow to offset a well through surface sampling of a fracture that joins with an adjacent well fracture. The tracers according to embodiments of the disclosure may be used to determine fluid pathways and connectivity between wells or zones. Determining reservoir inter-well connectivity improves sweep efficiency. Additional applications of the tracers described herein include, but are not limited to, inflow measurements, filtrate tracers, production profiling, inefficiency mapping, cluster redesign, completion redesign, and diagnostic reporting.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A polymer-based well tracer, comprising: a fluoropolymer having a fluorinated tracer covalently bonded with a polymer, wherein upon reaction with water and degradation of the fluoropolymer, the fluorinated tracer comprising a fluorinated compound is released.

2. The polymer-based well tracer of claim 1, wherein the fluoropolymer is a polyester.

3. The polymer-based well tracer of claim 1, wherein the fluorinated compound is a fluoro diol.

4. The polymer-based well tracer of claim 1, wherein the fluoropolymer is synthesized from fluoro carboxylic acids.

5. The polymer-based well tracer of claim 1, wherein the fluoropolymer is formed into a particle.

6. The polymer-based well tracer of claim 1, wherein the fluoropolymer is coated onto proppant particulates.

7. The polymer-based well tracer of claim 1, wherein the fluoropolymer is encapsulated in a polymeric resin.

* * * * *